United States Patent Office 3,526,472
Patented Sept. 1, 1970

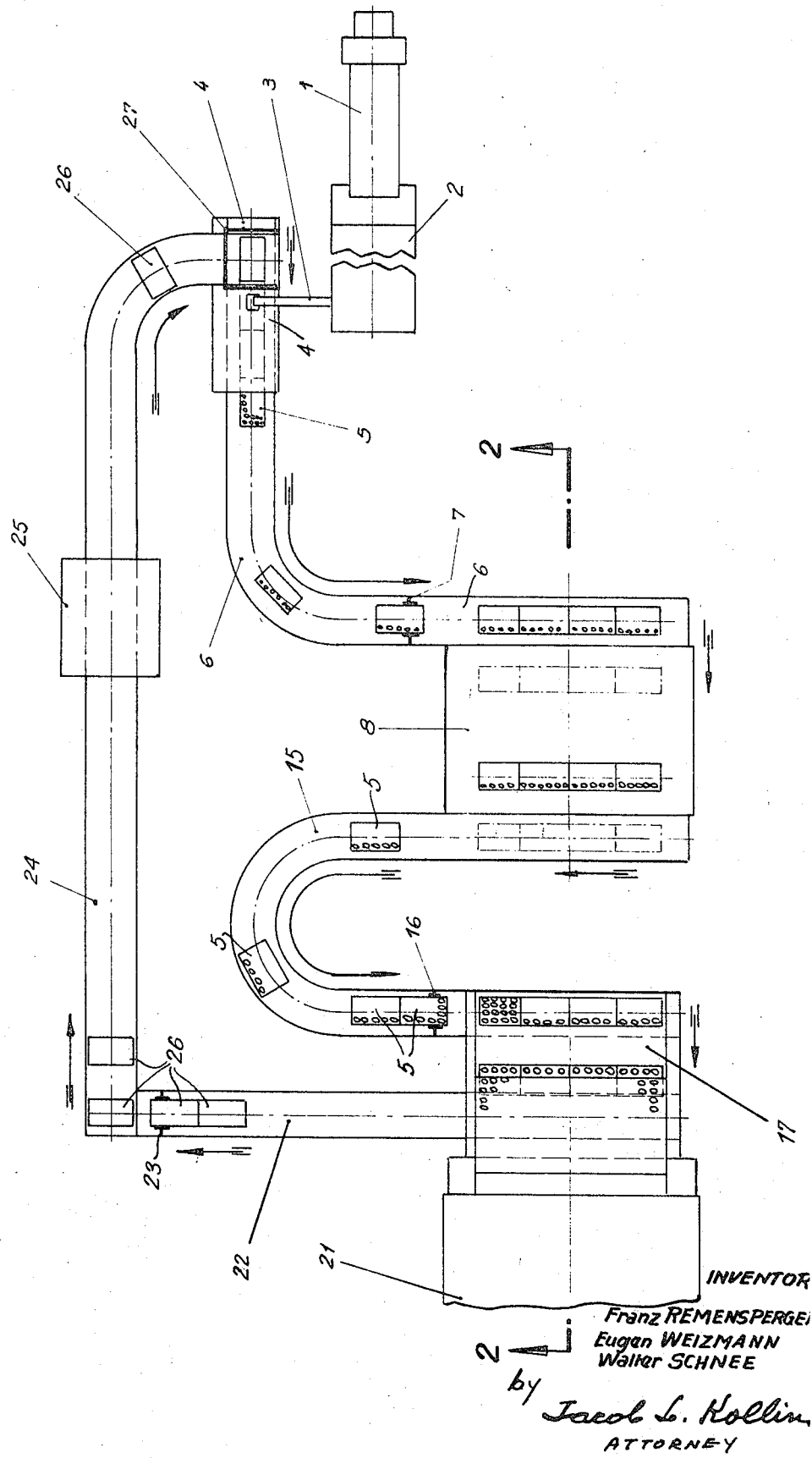

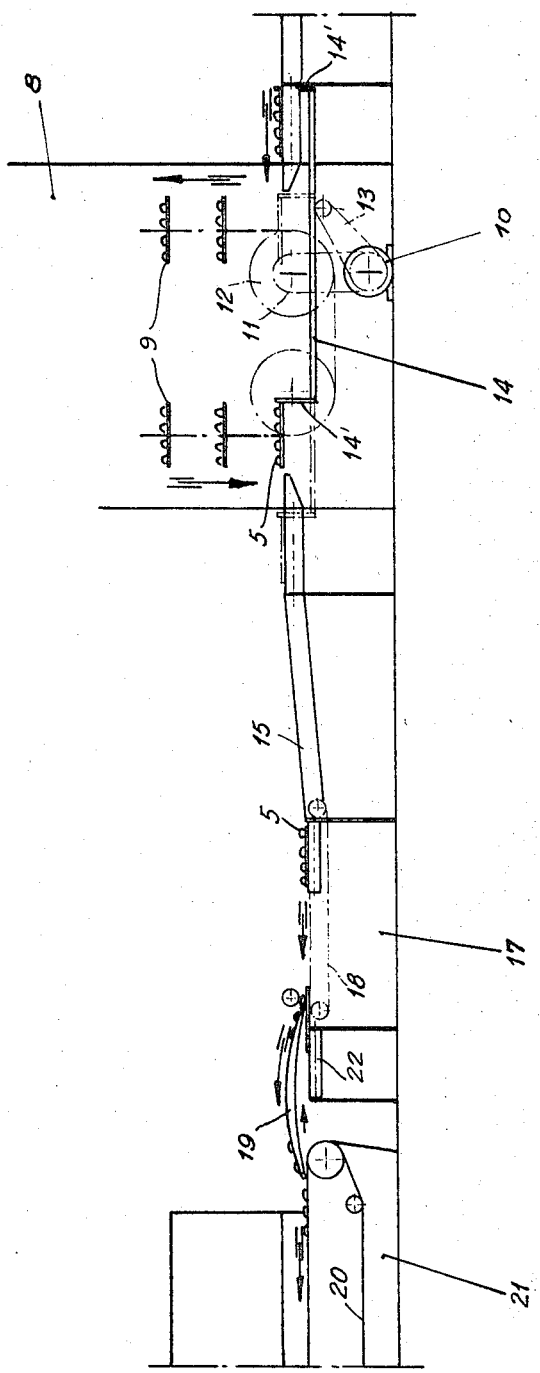

3,526,472
APPARATUS OF MANUFACTURING BAKED PRODUCTS
Franz Remensperger, St. Georgen, and Eugen Weizmann and Walter Schnee, Villingen, Germany, assignors to Fr. Winkler KG., Villingen, Black Forest, Germany
Filed Oct. 1, 1962, Ser. No. 227,205
Claims priority, application Germany, Sept. 30, 1961, W 30,805
The portion of the term of the patent subsequent to Jan. 1, 1984, has been disclaimed
Int. Cl. A21b 7/00
U.S. Cl. 107—57    4 Claims

ABSTRACT OF THE DISCLOSURE

A baking plant is provided wherein a plurality of conveyors carry carrier plate having dough thereon from a forming station to and through a proofing chamber to the baking oven. At the oven the dough pieces are removed from the carrier plates and the plates are conveyed to the forming station.

---

In the bakery art, the goal is to automate extensively the operations required for the manufacture of baking products. Such operations include the filling of the dough dividing machines, the dividing of the dough and the round or oblong shaping, other subsequent manipulations, the loading and emptying of the fermentation cabinets and the intermediate fermentation cabinets and the baking ovens as well as the conveying of the pieces of dough from one working stage to another.

Methods presently known are not satisfactory because several of the operational steps, and the intermediate operational steps are carried out manually. Furthermore, the installations which serve for the carrying out of known methods cannot be employed universally, i.e. adapted in each case to the different types of baked goods requiring varying fermentation and pre-fermentation time, manipulation and baking time. Moreover they are always constructed only for a particular baked product.

The object of the invention is to provide apparatus for manufacturing baked goods in which the joint manipulations and conveying steps are automatic and may be selectively controlled to correspond with each baked product.

A further object of the invention is to provide an especially careful handling of the baked goods. This is accomplished through the employment of fermentation carriers on which the dough pieces are placed after their manipulation and on which they remain through their entire travel to the baking oven. There they are carefully removed from the fermentation carriers.

A further very important object of the invention is to conduct back automatically, to a collection point, the emptied carriers in a circular path and from this collection point to again arrange these in the conveying path of the dough pieces.

Of particular importance in this connection is the preparation of the emptied trays on their way to the collection points for the reloading with dough pieces, i.e. to clean, wash, dry and the cleaning, washing, drying and sprinkling of the trays to sprinkle the flour.

The invention resides essentially in a method for manufacturing baked goods in which the dough pieces, after division of the dough and after the pre-fermentation in a treatment machine are subsequently loaded synchronously with the working cycle of the dough trays according to the method, and are conveyed with these over a final fermentation cabinet to the baking oven. At the entrance to this baking oven the dough pieces are removed from the carriers and are carried further, while the emptied carriers are conveyed in a separate circular path and are prepared for receiving new dough pieces and are again conducted to the treatment machine.

Other objects and a fuller understanding of the invention may be had by referring to the following description and claims, taken in conjunction with the accompanying drawings.

It should be understood, however, that these are given by way of illustration and not of limitation, and that various changes in the details, form and arrangement of the parts may be made without departing from the scope of the invention.

In the drawings:

FIG. 1 is a schematic plan view of an installation for the carrying out of the method according to the invention and FIG. 2 is a schematic cross-sectional view taken on line 2—2 of FIG. 1.

The pieces of dough which are intended for producing baked goods are divided in a conventional dough dividing machine 1 in the installation, e.g. kneaded in a kneading machine which is connected with the dough dividing machine. They are then pre-fermented in an intermediate fermenting cabinet 2, of known construction, and are conveyed to a processing machine 4 by means of an endless conveyor 3. This machine 4 may be a dough kneading machine, in case the dough has not already been kneaded in a kneading machine connected with the dough dividing machine. This machine can also be a punching, cutting or pressing machine or any other machine which forms the dough pieces or provides various ingredients. Inside the processing machine the ready processed dough pieces are placed without interruption on passing fermentation plates 5, which are introduced in a manner to be described later and which are moved forward by a first continuously running conveyor means 6, constructed as an endless conveyor or roller conveyor and the like. At the end of the movable conveyor of this conveyor mechanism 6, there is disposed first braking means 7 which halts the arriving fermentation plates until a predetermined number of plates is retained and until a predetermined number of fermentation plates are to be led to the next station corresponding to the working rhythm of the bakery plant. In general, there will be provided an electric or electromechanical control mechanism. For example there may be installed, on the one hand, a mechanical or electrical device in the path of the arousing fermentation plates 5, in particular a photo-electric contact device controlled by the arriving plates 5 and set for a certain number of pieces and actuating a counting relay, said contact device disengaging the brake mechanism when a predetermined number of plates have been reached to be moved by the conveyor 6, having rollers which drive, by friction plates 5. On the other hand, there may be provided contact devices additionally actuating the brake mechanism, for example a contact disc which is synchronously controlled with the drive of the roller conveyor device or the following stations.

The station following the first conveyor means or the roller conveyor mechanism 6, is a final fermentation cabinet 8 which is constructed in known manner as a suspension cabinet. It is provided with moving chains 9, on which are suspended supports for plates 5. The suspension 9 (FIG. 2) which forwards next the fermentation plates upward to the right, downward, and then to the left, downward, is driven by an electric motor 10 which is connected by means of a belt drive 11 with one of the sprocket wheels 12 of the suspension chain 9. The fermentation plates 5 are moved away from the conveyor mechanism 6 which extends along the inlet openings of the final fermenting cabinet 8, by means of a reciprocating slide 14 driven by a motor 10 through an intermediate belt drive 11 and the fermentation plates are brought onto the suspension 9. As the reciprocating slide 14 moves to the left side, its projection 14 pushes the fermentation plates 5 from the conveyor 6 onto the right support of the chain 8 and its projection 14″ simultaneously pushes the fermentation plates 5, oppositely disposed on the left supports of the chains 9 through the outlet openings of the fermentation cabinet 8 onto the following conveyor 15. At the end of this conveyor there is again arranged a second brake means which is constructed and controlled in a manner similar to that of the brake mechanism 7 arranged before the inlet openings of the end fermentation cabinet 8 of the conveyor mechanism 6.

The transport conveyor 16 leads to a mechanism 17 which serves for removing the pieces of dough from the fermentation plates and for the further conveying of the emptied fermentation plates. This mechanism 17 comprises an endless conveyor 18 which is always movable transversely to the conveyor 15, and a further conveyor 19 movable in an opposite direction and which is guided in an arcuate path and disposed on the right, at the level of the plates, said conveyor 19 transporting the dough pieces from the plates 5 to a constantly operating forwarding second conveyor means 20 to a baking oven 21.

The emptied fermentation plates 5 are forwarded from the transverse conveyor 18 under the right end of the conveyor 19 and particularly to a third conveyor means or roller conveyor 22, which travels transversely to the conveyor 18 and 19, and on the end of which there is disposed a brake mechanism 23 which adequately decreases the travel velocity of the fermentation plates. A short distance to the rear there is connected a reverse conveying mechanism 24 which is constructed as an endless driven conveyor and which is in constant operation. The conveyor 22 pushes the emptied fermentation plates 26 up to another roller conveyor 24 arranged transversely to the conveyor 22. The reverse conveying mechanism returns the emptied plates 26, in a circle, through a machine 25, serving for cleaning, washing, drying and flouring the plates, to a collection mechanism 27, from which the prepared plates 26 are brought upon the conveyor mechanism 6 which leads to the processing machine and which passes therethrough. The collection mechanism 27 may consist e.g. of a storage cabinet in which are deposited automatically the emptied pans brought back by the return conveyor mechanism from above, and from which the pans are automatically removed below by means of an endless conveyor mechanism 6.

The invention having thus been described, what is claimed and desired to be secured by Letters Patent of the United States of America is:

1. In a fully automatic baking plant provided with a plurality of intermediate stations, a dough piece forming station, a final fermenting cabinet, first conveyor means for moving dough pieces from said station to one side of said fermenting cabinet, including a plurality of flat carrier plates for the dough pieces, first braking means at the fermenting cabinet for halting a predetermined number of plates at the fermenting cabinet, a baking oven, second conveyor means for conveying the carrier plates with the dough pieces thereon from an opposite side of said fermentation cabinet to said baking oven, second braking means at said oven for halting a predetermined number of plates at said oven, means for transferring carrier plates with dough thereon from said first conveyor means to the fermentation cabinet and for subsequent transfer thereof from the fermentation cabinet to said second conveyor means, means at said baking oven for removing the dough pieces from the carrier plates and placing the dough pieces in the baking oven, third conveyor means for conveying empty carrier plates from said oven back to said dough piece forming station and means for transferring said empty carrier plates from said second conveyor means to said third conveyor means, all said means being operated in timed relationship.

2. In a fully automatic baking plant according to claim 1, all said conveyor means being endless roller conveyors, said first braking means being arranged to halt a group of said carrier plates extending the width of said one side of said fermenting cabinet, said second braking means being arranged to halt a group of said carrier plates extending the width of said oven.

3. In a fully automatic baking plant according to claim 2, wherein said second conveyor means extends in an arcuate configuration, said means for removing the dough pieces comprising a forwarding conveyor at said oven adjacent said second conveyor to said oven.

4. In a fully automatic baking plant, according to claim 3, means for cleaning, washing, drying, and flouring the dough pieces, interposed in the path of said third conveyor.

References Cited

UNITED STATES PATENTS

| | | | |
|---|---|---|---|
| 1,334,024 | 3/1920 | Embrey | 107—4.3 |
| 1,652,325 | 12/1927 | Pletscher | 107—4 |
| 2,780,182 | 2/1957 | Rand | 107—57 XR |
| 3,018,742 | 1/1962 | Ward | 107—55 |
| 3,034,455 | 5/1962 | Roth et al. | 107—4 |
| 3,146,730 | 9/1964 | White | 107—57 XR |

FOREIGN PATENTS

| | | |
|---|---|---|
| 215,897 | 7/1958 | Australia. |
| 223,446 | 10/1924 | Great Britain. |

B. J. WILHITE, Primary Examiner

R. I. SMITH, Assistant Examiner